(12) United States Patent
Sato et al.

(10) Patent No.: US 11,532,812 B2
(45) Date of Patent: Dec. 20, 2022

(54) ALL-SOLID LITHIUM ION SECONDARY BATTERY

(71) Applicant: TDK CORPORATION, Tokyo (JP)

(72) Inventors: Hiroshi Sato, Tokyo (JP); Masahiro Oishi, Tokyo (JP); Haruna Kato, Tokyo (JP); Taisuke Masuko, Tokyo (JP); Tomohiro Yano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 368 days.

(21) Appl. No.: 16/335,609

(22) PCT Filed: Sep. 25, 2017

(86) PCT No.: PCT/JP2017/034482
§ 371 (c)(1),
(2) Date: Mar. 21, 2019

(87) PCT Pub. No.: WO2018/062081
PCT Pub. Date: Apr. 5, 2018

(65) Prior Publication Data
US 2019/0305306 A1 Oct. 3, 2019

(30) Foreign Application Priority Data
Sep. 29, 2016 (JP) .............................. JP2016-192080

(51) Int. Cl.
*H01M 4/13* (2010.01)
*H01M 4/36* (2006.01)
(Continued)

(52) U.S. Cl.
CPC ............. *H01M 4/366* (2013.01); *H01M 4/13* (2013.01); *H01M 4/131* (2013.01); *H01M 4/36* (2013.01);
(Continued)

(58) Field of Classification Search
CPC .... H01M 4/13; H01M 10/0585; H01M 10/04; H01M 10/0471; H01M 10/05;
(Continued)

(56) References Cited

U.S. PATENT DOCUMENTS 8,304,115 B1 * 11/2012 Petkov ................ H01M 50/431
429/304
2007/0048617 A1 * 3/2007 Inda .................... C03C 10/0054
429/304
(Continued)

FOREIGN PATENT DOCUMENTS

| CN | 103682271 A | 3/2014 |
| JP | 2003-272623 A | 9/2003 |

(Continued)

OTHER PUBLICATIONS

Huang et al. (Journal of Power Sources vol. 196 No. 16 pp. 6943-6946 2011).*
(Continued)

*Primary Examiner* — Cynthia H Kelly
*Assistant Examiner* — Aaron J Greso
(74) *Attorney, Agent, or Firm* — Oliff PLC

(57) ABSTRACT

An all-solid lithium ion secondary battery includes a pair of electrodes and a solid electrolyte provided between the pair of electrodes. At least one of the pair of electrodes includes an active-material layer and an intermediate layer. An active material constituting the active-material layer has a core-shell structure which has a core region and a shell region and a composition of the intermediate layer is intermediate between the solid electrolyte and the shell region.

20 Claims, 4 Drawing Sheets

(51) Int. Cl.
  *H01M 4/58* (2010.01)
  *H01M 4/62* (2006.01)
  *H01M 4/131* (2010.01)
  *H01M 10/052* (2010.01)
  *H01M 10/0525* (2010.01)
  *H01M 10/0562* (2010.01)

(52) U.S. Cl.
  CPC ............... *H01M 4/58* (2013.01); *H01M 4/62* (2013.01); *H01M 10/052* (2013.01); *H01M 10/0525* (2013.01); *H01M 10/0562* (2013.01); *H01M 2300/0071* (2013.01); *Y02E 60/10* (2013.01)

(58) Field of Classification Search
  CPC ... H01M 2004/021; H01M 2300/0068; H01M 4/36; H01M 4/58; H01M 4/62; H01M 4/131; H01M 4/366; H01M 10/052; H01M 10/0525; H01M 10/0562; H01M 2300/0071; Y02E 60/10
  See application file for complete search history.

(56) References Cited

U.S. PATENT DOCUMENTS

| | | | |
|---|---|---|---|
| 2007/0202400 | A1 | 8/2007 | Yoshida et al. |
| 2013/0059209 | A1 | 3/2013 | Ota et al. |
| 2013/0093130 | A1 | 4/2013 | Yada et al. |
| 2013/0330616 | A1 | 12/2013 | Christensen |
| 2014/0011100 | A1* | 1/2014 | Lee ................... H01M 10/052 429/403 |
| 2014/0045067 | A1 | 2/2014 | Cho et al. |
| 2014/0065481 | A1 | 3/2014 | Yoshida et al. |
| 2016/0064773 | A1* | 3/2016 | Choi ................... H01M 10/052 429/303 |
| 2016/0093914 | A1* | 3/2016 | Tanoue ............... H01M 4/0471 429/319 |
| 2016/0141716 | A1* | 5/2016 | Ito ....................... H01M 10/052 429/162 |
| 2018/0053936 | A1 | 2/2018 | Sato et al. |

FOREIGN PATENT DOCUMENTS

| | | | | |
|---|---|---|---|---|
| JP | 2012-094407 | A | 5/2012 | |
| JP | 5115920 | B2 | 1/2013 | |
| JP | 2014-049195 | A | 3/2014 | |
| JP | 2014-505992 | A | 3/2014 | |
| JP | 2015-167095 | * | 9/2015 | ............ Y02E 60/10 |
| WO | 2011/145462 | A1 | 11/2011 | |
| WO | 2012/001808 | A1 | 1/2012 | |
| WO | 2016/139957 | A1 | 9/2016 | |

OTHER PUBLICATIONS

Montes et al. (IntecOpen pp. 1-29 "Electrical resistivity of Powdered Porous Compacts" published Online Nov. 5, 2018 {https://www.intechopen.com/books/electrical-and-electronic-properties-of-materials/electrical-resistivity-of-powdered-porous-compacts}).*
Han et al. [Han] (Journal of Materials Chemistry A 2015 vol 3, pp. 11930-11939).*
Yoshiaki et al JP 2015-167095 Espacenet English Machine Translation printed Dec. 22, 2021.*
Yoshiaki et al JP 2015-167095 Espacenet Abstract printed Dec. 22, 2021.*
American Polymer Standards Corporation Polyethylene Oxide SDS Rev Mar. 31, 2022 {http://www.ampolymer.com/SDS/PolyethyleneOxideSDS.html}.*
Agilent Technologies Apr. 30, 2020 SDS Polyethylene Oxide.*
Nov. 7, 2017 International Search Report issued in International Patent Application PCT/JP2017/034482.
Nov. 7, 2017 Search Report issued in International Patent Application No. PCT/JP2017/034474.
Apr. 2, 2020 Office Action issued in U.S. Appl. No. 16/333,039.
U.S. Appl. No. 16/333,039, filed Mar. 13, 2019 in the name of Sato et al.
English-language translation of Jul. 2, 2021 Office Action issued in Chinese Patent Application No. 201780058545.X.
Dec. 27, 2021 English-language Translation of Office Action issued in Chinese Patent Application No. 201780059029.9.
Apr. 8, 2022 Office Action issued in Chinese Patent Application No. 201780058545.X (English-translation).

* cited by examiner

ALL-SOLID LITHIUM ION SECONDARY BATTERY

TECHNICAL FIELD

The present invention relates to an all-solid lithium ion secondary battery.

Priority is claimed on Japanese Patent Application No. 2016-192080, filed Sep. 29, 2016, the content of which is incorporated herein by reference.

BACKGROUND ART

In recent years, batteries have been used for various purposes. Batteries are also used, for example, as portable batteries and the like and reduction in size and weight, reduction in thickness, and improvement in reliability thereof are required. Batteries using an electrolyte solution have a problem such as leakage which causes ignition. Thus, attention has been paid to all-solid type lithium ion secondary batteries using a solid electrolyte. For example, Patent Literature 1 discloses a polyanion-based all-solid lithium ion secondary battery having a predetermined composition.

On the other hand, an all-solid lithium ion secondary battery has a problem that an output thereof is smaller than those of batteries using electrolyte solutions. Thus, it is necessary to enhance an Li diffusion rate and the electron conductivity of all-solid lithium ion secondary batteries.

For example, Patent Literature 2 discloses a positive electrode active material for a non-aqueous electrolyte secondary battery having a core-shell structure. Since an active material has a core portion and a shell portion in which the core portion is coated with the shell portion and contains a predetermined amount or more of carbon, the electron conductivity of the non-aqueous electrolyte secondary battery is enhanced.

Also, for example, Patent Literature 3 discloses an active material for a non-aqueous electrolyte secondary battery which includes a core body and a shell body having an olivine structure. Since the shell body has a stable olivine structure, lithium can be stably carried in and out during charging and discharging. As a result, battery cycle characteristics are improved.

CITATION LIST

Patent Literature

[Patent Literature 1]
Japanese Patent No. 5115920(B)
[Patent Literature 2]
Japanese Unexamined Patent Application, First Publication No. 2014-49195(A)
[Patent Literature 3]
Japanese Unexamined Patent Application, First Publication No. 2012-94407(A)

SUMMARY OF INVENTION

Technical Problem

However, the batteries described in Patent Literatures 1 to 3 have a problem that the internal resistances thereof are large.

The all-solid lithium ion secondary battery described in Patent Literature 1 has poor electron conductivity and the internal resistance thereof cannot be reduced sufficiently.

In the all-solid lithium ion secondary batteries described in Patent Literatures 2 and 3, the adhesion at the interfaces between the shell portion and the core portion and between the shell portion and the solid electrolyte is not sufficient. Particularly, since both of the compositions and the shapes of the core portion and the solid electrolyte are different in the portion in which the core portion is exposed, sufficient adhesion cannot be obtained. A decrease in the adhesion at each interface causes minute peeling or the like at the interface and produces an increase in the internal resistance of the all-solid lithium ion secondary battery.

Also, in Patent Literature 2, the carbon constituting the shell portion does not contribute to the exchange of lithium ions in an active material. For this reason, the battery capacity of the all-solid lithium ion secondary battery is also low.

The present invention was made in view of the above-described problems and an objective of the present invention is to provide an all-solid lithium ion secondary battery having high a capacity and in which the internal resistance is able to be reduced.

Solution to Problem

The inventors of the present invention have found that, by providing an intermediate layer between an active material which has a core-shell structure having a core region and a shell region and a solid electrolyte, the core region and the solid electrolyte can be prevented from coming into direct contact with each other and the internal resistance of the all-solid lithium ion secondary battery can be reduced.

That is to say, in order to solve the above-described problems, the following means are provided.

An all-solid lithium ion secondary battery according to a first aspect of the present invention includes: a pair of electrodes and a solid electrolyte provided between the pair of electrodes, wherein at least one of the pair of electrodes includes an active-material layer and an intermediate layer, an active material constituting the active-material layer has a core-shell structure having a core region and a shell region, and a composition of the intermediate layer is intermediate between the solid electrolyte and the shell region.

An all-solid lithium ion secondary battery according to a second aspect of the present invention includes: a pair of electrodes and a solid electrolyte provided between the electrodes, wherein at least one of the pair of electrodes includes an active-material layer and an intermediate layer, an active material constituting the active-material layer has a core-shell structure having a core region and a shell region, and the intermediate layer has particles larger than an average particle size of the active material.

In the all-solid lithium ion secondary battery according to the above-described aspect, both of the pair of electrodes may include the active-material layer and the intermediate layer.

In the all-solid lithium ion secondary battery according to the above-described aspect, the intermediate layer may have a crystal structure identical to a crystal structure of at least one of the solid electrolyte and the active material.

In the all-solid lithium ion secondary battery according to the above-described aspect, a thickness of the intermediate layer may be a thickness or more of the shell region.

In the all-solid lithium ion secondary battery according to the above-described aspect, the thickness of the intermediate layer may be 0.5 μm or more and 5.0 μm or less.

In the all-solid lithium ion secondary battery according to the above-described aspect, an amount of transition metals in the core region may be more than an amount of transition metals in the shell region, and an amount of oxygen deficiency in the shell region may be more than an amount of oxygen deficiency in the core region In the all-solid lithium ion secondary battery according to the above-described aspect, the core region may contain 10 to 40 wt % of V and the shell region may contain 0.1 to 15 wt % of Ti.

In the all-solid lithium ion secondary battery according to the above-described aspect, an average particle size Pc of the core region and a thickness Ps of the shell region may satisfy a relationship of $0.4 \leq Pc/(2Ps+Pc) \leq 0.98$.

In the all-solid lithium ion secondary battery according to the above-described aspect, the active-material layer, the intermediate layer, and the solid electrolyte may contain identical elements.

In the all-solid lithium ion secondary battery according to the above-described aspect, the core region of the active material, the shell region of the active material, the intermediate layer, and the solid electrolyte may satisfy a general formula (1) below, $Li_aV_bAl_cTi_dP_eO_{12-x}$ (1), $0.5 \leq a \leq 3.0$, $1.2 \leq b \leq 2.0$, $0.01 \leq c \leq 0.06$, $0.01 \leq d \leq 0.60$, $2.8 \leq e \leq 3.2$, and $0 \leq x < 12$ may be satisfied in the core region, $0.5 \leq a \leq 3.0$, $1.0 \leq b \leq 1.2$, $0.06 \leq c \leq 0.09$, $0.6 \leq d \leq 1.4$, $2.8 \leq e \leq 3.2$, and $0 \leq x < 12$ may be satisfied in the shell region, $0.5 \leq a \leq 3.0$, $1.0 \leq b \leq 1.2$, $0.06 \leq c \leq 0.09$, $0.6 \leq d \leq 1.4$, $2.8 \leq e \leq 3.2$, and $0 \leq x < 12$ may be satisfied in the intermediate layer, and $0.5 \leq a \leq 3.0$, $0.01 \leq b < 1.0$, $0.09 < c \leq 0.30$, $1.4 < d \leq 2.0$, $2.8 \leq e \leq 3.2$, and $0 \leq x < 12$ may be satisfied in the solid electrolyte.

In the all-solid lithium ion secondary battery according to the above-described aspect, $0.8 \leq a \leq 3.0$, $1.2 < b \leq 2.0$, $0.01 \leq c < 0.06$, $0.01 \leq d < 0.60$, $2.9 \leq e \leq 3.1$, and $0 \leq x < 12$ may be satisfied in the core region, $0.8 \leq a \leq 3.0$, $1.0 \leq b \leq 1.2$, $0.06 \leq c \leq 0.09$, $0.6 \leq d \leq 1.4$, $2.9 \leq e \leq 3.1$, and $0 \leq x < 12$ may be satisfied in the shell region, $0.8 \leq a \leq 3.0$, $1.0 \leq b \leq 1.2$, $0.06 \leq c \leq 0.09$, $0.6 \leq d \leq 1.4$, $2.9 \leq e \leq 3.1$, and $0 \leq x < 12$ may be satisfied in the intermediate layer, and $0.8 \leq a \leq 3.0$, $0.01 \leq b < 1.0$, $0.09 < c \leq 0.3$, $1.4 < d \leq 2.0$, $2.9 \leq e \leq 3.1$, and $0 \leq x < 12$ may be satisfied in the solid electrolyte.

In the all-solid lithium ion secondary battery according to the above-described aspect, the pair of electrode layers and the solid electrolyte layer provided between the pair of electrode may have a relative density of 80% or more.

Advantageous Effects of Invention

An all-solid lithium ion secondary battery having a large battery capacity and reduced internal resistance can be obtained.

DESCRIPTION OF EMBODIMENTS

Figure 1:
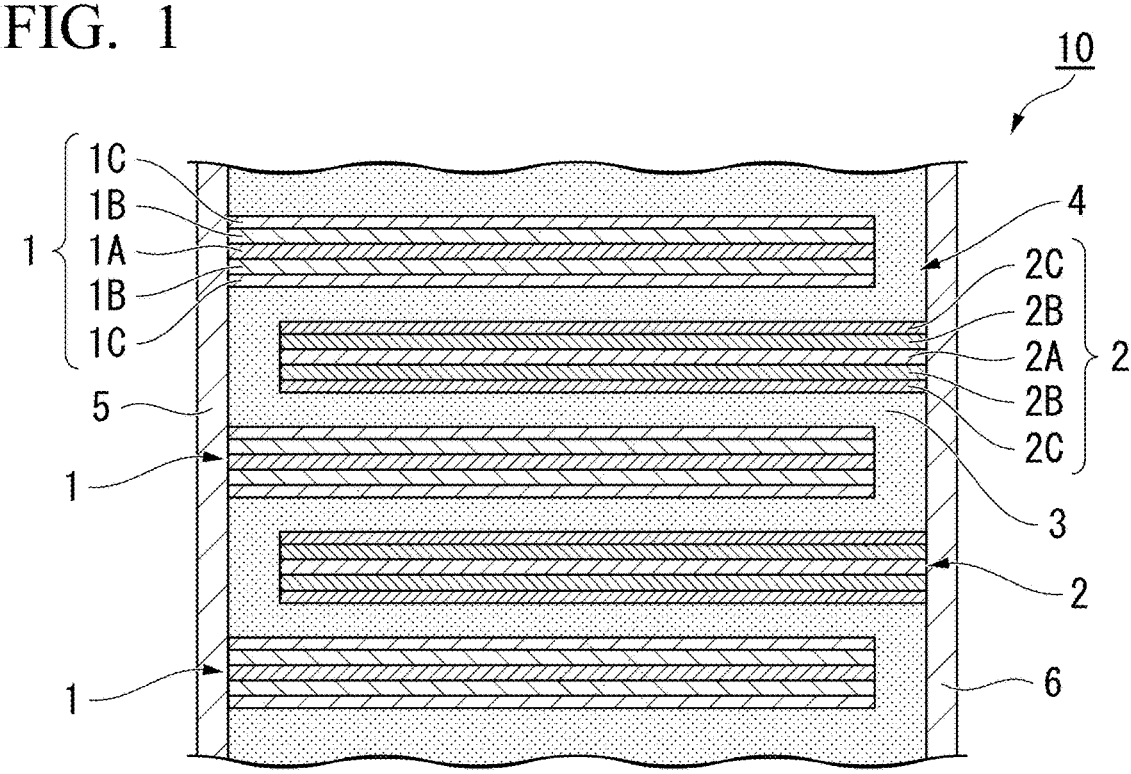
FIG. 1 is an enlarged schematic cross-sectional view of a main part of an all-solid lithium ion secondary battery according to an embodiment.

An embodiment will be described in detail below with reference to the drawings as appropriate. In the drawings used in the following description, in order to facilitate understanding of the features of the embodiment, for the sake of convenience, enlarged characteristic portions are illustrated in some cases and dimensional ratios between the constituent elements and the like may be different from the actual dimension ratio in some cases. The materials, dimensions, and the like exemplified in the following description are mere examples and the embodiment is not limited thereto and the embodiment can be implemented through appropriate modifications without departing from the gist of the present invention.

FIG. 1 is an enlarged schematic cross-sectional view of a main part of an all-solid lithium ion secondary battery according to an embodiment. As illustrated in FIG. 1, an all-solid lithium ion secondary battery 10 includes a laminate 4 which includes first electrode layers 1, second electrode layers 2, and a solid electrolyte 3. The first electrode layer 1 and the second electrode layer 2 form a pair of electrodes.

Each of the first electrode layers 1 is connected to a first external terminal 5 and each of the second electrode layers 2 is connected to a second external terminal 6. The first external terminal 5 and the second external terminal 6 are points of electrical contact to the outside.

(Laminate)

Figure 2:
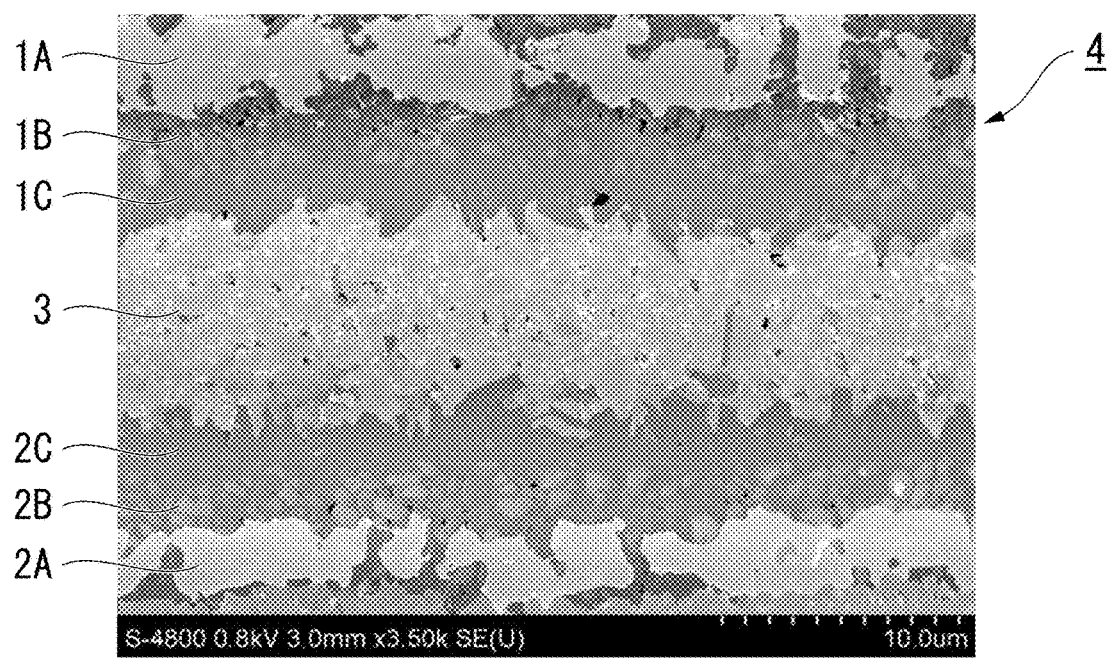
FIG. 2 is a cross-sectional view of the main part of the all-solid lithium ion secondary battery according to the embodiment captured by a scanning type microscope.

FIG. 2 is a cross-sectional view of the main part of the all-solid lithium ion secondary battery according to the embodiment captured by a scanning type microscope. The laminate 4 includes the first electrode layer 1, the second electrode layer 2, and the solid electrolyte 3. Either one of the first electrode layer 1 and the second electrode layer 2 functions as a positive electrode and the other electrode layer functions as a negative electrode. The polarity of an electrode layer changes in accordance with the polarity of an external terminal to be connected to the electrode layer. Hereinafter, in order to facilitate understanding of the embodiment, the first electrode layer 1 is set to be a positive electrode layer 1 and the second electrode layer 2 is set to be a negative electrode layer 2.

In the laminate 4, the positive electrode layer 1 and the negative electrode layer 2 are alternately laminated with the solid electrolyte 3 therebetween. Charging and discharging of the all-solid lithium ion secondary battery 10 is performed by lithium ions being exchanged between the positive electrode layer 1 and the negative electrode layer 2 via the solid electrolyte 3.

"Positive Electrode Layer and Negative Electrode Layer"

The positive electrode layer 1 includes a positive electrode current collector 1A, a positive electrode active-material layer 1B containing a positive electrode active material, and a positive electrode intermediate layer 1C configured to connect the positive electrode active-material layer 1B to the solid electrolyte 3. The negative electrode layer 2 includes a negative electrode current collector 2A, a negative electrode active-material layer 2B containing a negative electrode active material, and a negative electrode intermediate layer 2C configured to connect the negative electrode active-material layer 2B to the solid electrolyte 3. In FIG. 2, both of the positive electrode layer 1 and the negative electrode layer 2 have an intermediate layer, but only one of them may be configured to include an intermediate layer.

(Current Collector)

It is desirable that the positive electrode current collector 1A and the negative electrode current collector 2A have a high conductivity. For this reason, for example, silver, palladium, gold, platinum, aluminum, copper, nickel, or the like is preferably used for the positive electrode current collector 1A and the negative electrode current collector 2A. Among these substances, copper hardly reacts with a positive electrode active material, a negative electrode active material, and a solid electrolyte. For this reason, when copper is used for the positive electrode current collector 1A and the negative electrode current collector 2A, the internal resistance of the all-solid lithium ion secondary battery 10 can be reduced. It should be noted that materials constituting the positive electrode current collector 1A and the negative electrode current collector 2A may be the same or different.

The positive electrode current collector 1A and the negative electrode current collector 2A may include a positive electrode active material and a negative electrode active material which will be described later. A content of active materials contained in current collectors is not particularly limited as long as it functions as a current collector. For example, it is desirable that a volume ratio of a positive electrode current collector/a positive electrode active material or a negative electrode current collector/a negative electrode active material be in a range of 90/10 to 70/30.

By including a positive electrode active material and a negative electrode active material in the positive electrode current collector 1A and the negative electrode current collector 2A, it is possible to increase a contact area between the positive electrode current collector 1A and the positive electrode active-material layer 1B and the negative electrode current collector 2A and the negative electrode active-material layer 2B and it is possible for electrons to be exchanged more efficiently.

(Active-Material Layer)

The positive electrode active-material layer 1B is formed on one surface or both surfaces of the positive electrode current collector 1A. For example, in the positive electrode layer 1 located at the uppermost layer of the all-solid lithium ion secondary battery 10 in a laminating direction thereof, there is no facing negative electrode layer 2. For this reason, in the positive electrode layer 1 located at the uppermost layer of the all-solid lithium ion secondary battery 10, the positive electrode active-material layer 1B may be provided only on one surface which is the lower side in the laminating direction thereof. Like the positive electrode active-material layer 1B, the negative electrode active-material layer 2B is also formed on one surface or both surfaces of the negative electrode current collector 2A.

The positive electrode active-material layer 1B and the negative electrode active-material layer 2B contain a positive electrode active material or a negative electrode active material which exchanges electrons with lithium ions. In addition, a conductive auxiliary agent or the like may be included. It is desirable that a positive electrode active material and a negative electrode active material be able to efficiently insert and eliminate lithium ions.

There is no clear distinction between active materials constituting the positive electrode active-material layer 1B and the negative electrode active-material layer 2B. In addition, by comparing the potentials of the two kinds of compound, a compound exhibiting a nobler potential can be used as a positive electrode active material and a compound exhibiting a more base potential can be used as a negative electrode active material. Hereinafter, the positive electrode active-material layer 1B and the negative electrode active-material layer 2B are collectively referred to as an active-material layer B and the positive electrode active material and the negative electrode active material are collectively referred to as an active material.

Figure 3:
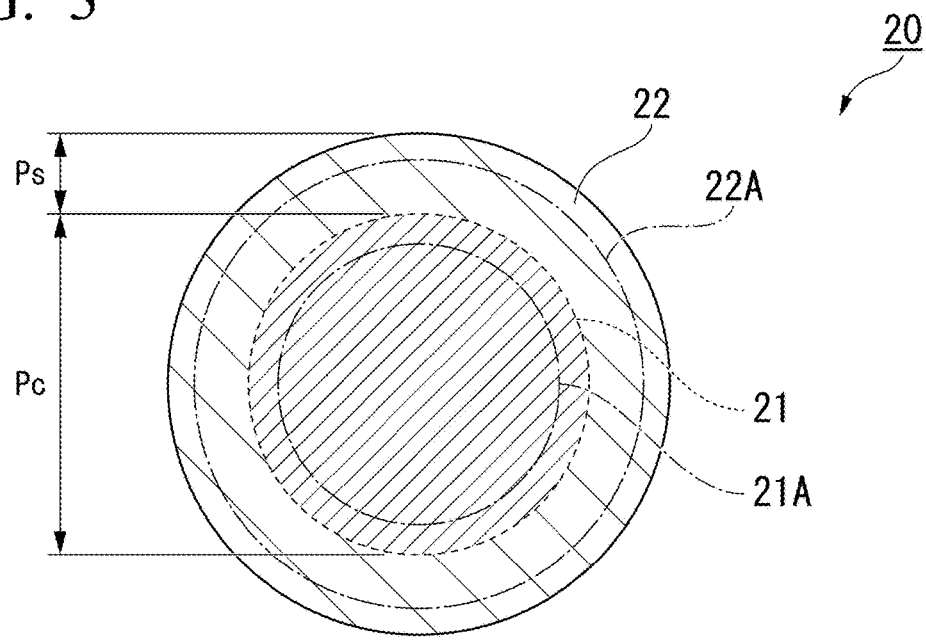
FIG. 3 is a schematic cross-sectional view of an active material in the embodiment.

FIG. 3 is a schematic cross-sectional view of an active material in the embodiment. Each piece of active material 20 includes a core portion 21 and a shell portion 22. The core portion 21 is present closer to a center of the active material 20 than the shell portion 22. The shell portion 22 is on an outer circumferential side of the core portion 21 and covers the core portion 21. The shell portion 22 does not need to completely cover the core portion 21 and the core portion 21 may partially be exposed.

Both of the core portion 21 and the shell portion 22 contain materials which can function as batteries. That is to say, lithium serving as a conductive carrier can be taken in and out from both of the core portion 21 and the shell portion 22.

It is desirable that the core portion 21 and the shell portion 22 be in a solid solution state. By making the core portion 21 and the shell portion 22 have a solid solution state, it is possible to increase adhesion therebetween and to prevent the contact resistance at an interface from increasing. That is to say, an increase in internal resistance of the all-solid lithium ion secondary battery 10 can be prevented.

When the core portion 21 and the shell portion 22 are in a solid solution state, it is difficult to clearly draw an interface therebetween. In this case, a core region 21A may be present as a central portion of the active material 20 and a shell region 22A may be present on an outer circumferential side thereof. The core region 21A is included in the core portion 21 and the shell region 22A is included in the shell portion 22.

It is desirable that the core region 21A be a region having an amount of transition metals which is more than that of the shell region 22A and the shell region 22A is a region having an amount of oxygen deficiency which is greater than that of the core region 21A.

The valences of transition metals vary. A transition metal can alleviate a change in electronic state at the time of taking in and out of lithium ions and can increase a battery capacity. Furthermore, when oxygen deficiencies are present in a crystal, electrons which have been originally trapped in oxygen become free electrons. For this reason, when there are oxygen deficiencies, the electron conductivity increases.

Figure 4:
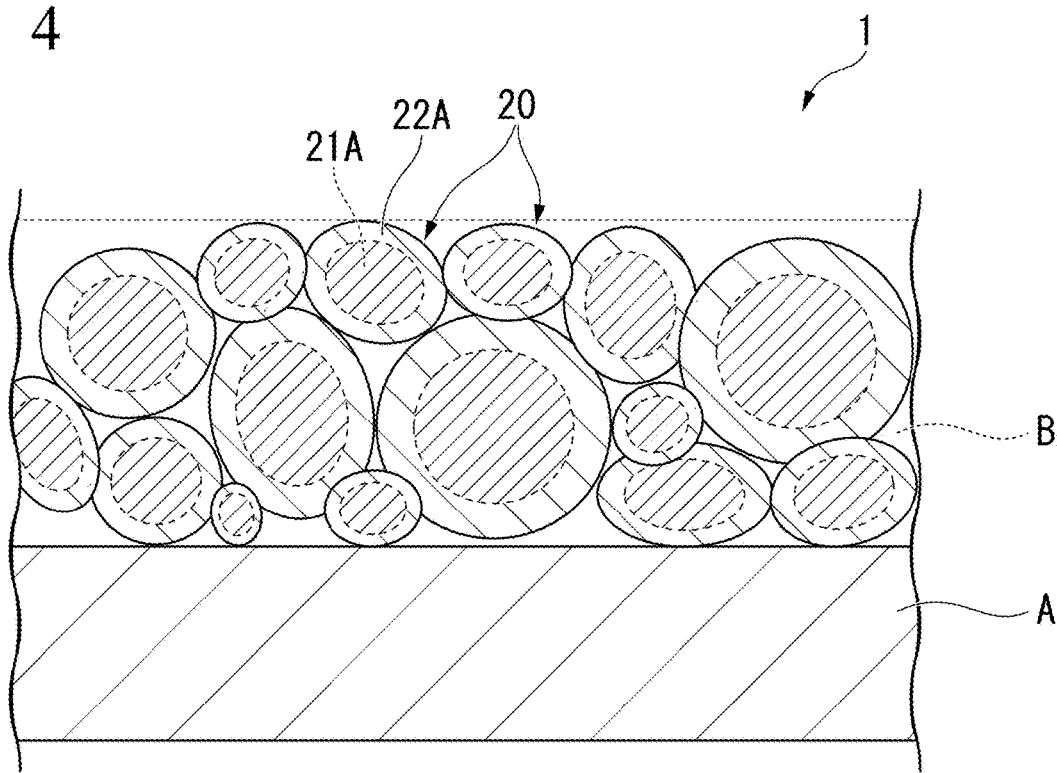
FIG. 4 is a secondary electron image (SET) of the main part of the all-solid lithium ion secondary battery according to the embodiment.

FIG. 4 is an enlarged schematic cross-sectional view of the vicinity of a positive electrode in the all-solid lithium ion secondary battery according to the embodiment. In the active-material layer B, the active material 20 is densely formed. The shell region 22A has a large amount of oxygen deficiency and a high electron conductivity. By bringing the shell regions 22A of the plurality of pieces of active material 20 into contact with each other, a conduction path for electrons is formed. That is to say, the exchange of electrons between the active materials 20 and the current collector is smoothly performed. As a result, it is possible to reduce the internal resistance of the all-solid lithium ion secondary battery 10.

Also, the shell region 22A not only supports conduction, but also contributes to the reaction of a battery itself. For this reason, it is possible to minimize reduction of a battery capacity due to the provision of the shell region 22A.

It is desirable that a transition metal be at least one selected from the group consisting of V, Mn, Co, Ni, Fe, Ti, Cu, Cr, Nb, and Mo. These transition metals are widely used in batteries and are readily available. These transition metals also impart high performance to a battery.

An amount of oxygen deficiency can be analyzed by a means such as a laser Raman spectroscopy, XAFS, ESR, TEM-EELS, powder X-ray Rietveld structure analysis, or cathodoluminescence. An amount of oxygen deficiency in each portion can be analyzed by scraping each of the active materials 20 from an outer circumferential side.

As illustrated in FIG. 3, an average particle size Pc of the core portion 21 including the core region 21A and a thickness Ps of the shell portion 22 including the shell region 22A preferably satisfy a relationship of $0.4 \leq Pc/(2Ps+Pc) \leq 0.98$, and more preferably satisfy a relationship of $0.6 \leq Pc/(2Ps+Pc) \leq 0.9$.

The core portion 21 greatly contributes to the capacity of the all-solid lithium ion secondary battery 10 and the shell portion 22 greatly contributes to a decrease in internal resistance of the all-solid lithium ion secondary battery 10. When the core portion 21 and the shell portion 22 satisfy the above-described relationship, it is possible to achieve both an increase in capacity of the all-solid lithium ion secondary battery and a decrease in internal resistance. Furthermore, the shell portion 22 alleviates the stress caused by a change in volume of the large-capacity core portion 21. For this reason, when the core portion 21 and the shell portion 22 satisfy the above-described relationship, it is possible to sufficiently alleviate a change in volume of the core portion 21 using the shell portion 22.

When the core portion 21 and the shell portion 22 have a clear interface, the average particle size Pc of the core portion 21 and the thickness Ps of the shell portion 22 are obtained using the interface as a boundary. When a clear interface is not provided, a value at a center of the active material 20 for a predetermined transition metal (for example, vanadium) and a value at an outer circumferential end thereof are measured and a portion serving as a median value thereof is set as a boundary.

A concentration of a predetermined transition metal can be measured using SEM-EDS, STEM-EDS, EPMA, LA-ICP-MS, or the like. For example, point analysis, line analysis, and surface analysis of each element may be performed and the core region 21A and the shell region 22A identified based on a change in concentration.

Although the active material illustrated in FIG. 3 is spherical, the actual active material is amorphous. For this reason, the average particle size Pc of the core portion 21 is obtained as follows. An image of a cross-sectional photograph of a lithium ion secondary battery photographed using a scanning electron microscope, a transmission electron microscope, or the like is analyzed and the average particle size Pc calculated from an area of the particle using a diameter of a particle when the particle is assumed to be circular, that is, an equivalent circle diameter as a particle size is used. It is desirable that the number of measurements be 300 or more in view of the reliability of data. It should be noted that a particle size and an average particle size in this specification refer to the above-described diameter corresponding to a circle.

For the active material 20, a transition metal oxide, a transition metal composite oxide, and the like can be used. Examples of a transition metal oxide and a transition metal composite oxide include a lithium manganese composite oxide $Li_2Mn_aMa_{1-a}O_3$ ($0.8 \leq a \leq 1$; Ma=Co or Ni), lithium cobaltate ($LiCoO_2$), lithium nickelate ($LiNiO_2$), a lithium manganese spinel ($LiMn_2O_4$), a composite metal oxide represented by a general formula: $LiNi_xCo_yMn_zO_2$ ($x+y+z=1$; $0 \leq x \leq 1$, $0 \leq y \leq 1$, and $0 \leq z \leq 1$), a lithium vanadium compound ($LiV_2O_5$), an olivine type $LiMbPO_4$ (where, Mb is at least one element selected from Co, Ni, Mn, Fe, Mg, Nb, Ti, Al, and Zr), a lithium vanadium phosphate ($Li_3V_2(PO_4)_3$ or $LiVOPO_4$), a Li-excess solid solution positive electrode represented by $Li_2MnO_3$—$LiMcO_2$ (Mc=Mn, Co, or Ni), lithium titanate ($Li_4Ti_5O_{12}$), a composite metal oxide represented by $Li_sNi_tCo_uAl_vO_2$ ($0.9 < s < 1.3$ and $0.9 < t+u+v < 1.1$), and the like.

Although the core region 21A and the shell region 22A are preferably made of the same substances having different compositions, the core region 21A and the shell region 22A may be made of different substances. When the core region 21A and the shell region 22A are made of different substances, substances are selected from the above-described transition metal oxides, transition metal composite oxides, and the like to satisfy the conditions of the core portion 21 and the shell portion 22. When the core region 21A and the shell region 22A are made of the same substance, a composition ratio thereof is varied so that the core region 21A and the shell region 22A satisfy the conditions.

The shell region 22A in the active material 20 preferably contain titanium (Ti). Furthermore, a Ti content of the shell region 22A is preferably higher than a Ti content of the core region 21A.

When Ti is contained, the electron conductivity enhances. Since the Ti content of the shell region 22A contributing to the conduction between the active materials 20 is higher than the Ti content of the core region 21A, the electron conductivity between the active materials 20 can enhance and the internal resistance of the all-solid lithium ion secondary battery 10 can be reduced. Furthermore, a valence of Ti can vary and the shell region 22A contributes to a function as a battery.

The core region 21A in the active material 20 preferably contains vanadium (V). Furthermore, a V content of the core region 21A is preferably higher than a V content of the shell region 22A.

When V is contained, the capacity of a battery increases. When a contribution rate of the core region 21A to the electron conduction is lower than that of the shell region 22A, it is desirable that a large amount of V be present to increase a battery capacity in the core region 21A.

It is desirable that the core region 21A contain 10 to 40 wt % of V and the shell region 22A contains 0.1 to 15 wt % of Ti. Since the core region 21A and the shell region 22A contain V and Ti in this range, it is possible to increase the battery capacity of the all-solid lithium ion secondary battery 10 and to reduce the internal resistance.

The core region 21A and the shell region 22A preferably contain identical elements, more preferably the same composition expression.

Since the core region 21A and the shell region 22A contain identical elements, it is possible to enhance the adhesion between the core portion 21 including the core region 21A and the shell portion 22 including the shell region 22A. Furthermore, the contact resistance at an interface between the core portion 21 and the shell portion 22 is reduced.

Also, it is further desirable that the following general formula (1) be satisfied for the core region 21A and the shell region 22A.

$$Li_aV_bAl_cTi_dPeO_{12-x} \quad (1)$$

0.5≤a≤3.0, 1.2<b≤2.0, 0.01≤c<0.06, 0.01≤d<0.60, 2.8≤e≤3.2, and 0≤x<12 are preferably satisfied for and 0.8≤a≤3.0, 1.2<b≤2.0, 0.01≤c<0.06, 0.01≤d<0.60, 2.9≤e≤3.1, and 0≤x<12 are more satisfied for the core region 21A.

0.5≤a≤3.0, 1.0≤b≤1.2, 0.06≤c≤0.09, 0.6≤d≤1.4, 2.8≤e≤3.2, and 0≤x<12 are preferably satisfied for and 0.8≤a≤3.0, 1.0≤b≤1.2, 0.06≤c≤0.09, 0.6≤d≤1.4, 2.9≤e≤3.1, and 0≤x<12 are more preferably satisfied for the shell region 22A.

Since the core region 21A and the shell region 22A satisfy the above-described relationship, it is possible to further enhance the adhesion between the core portion 21 including the core region 21A and the shell portion 22A including the shell region 22. Furthermore, it is possible to further reduce the contact resistance at the interface between the core portion 21 and the shell portion 22.

(Intermediate Layer)

Figure 5:
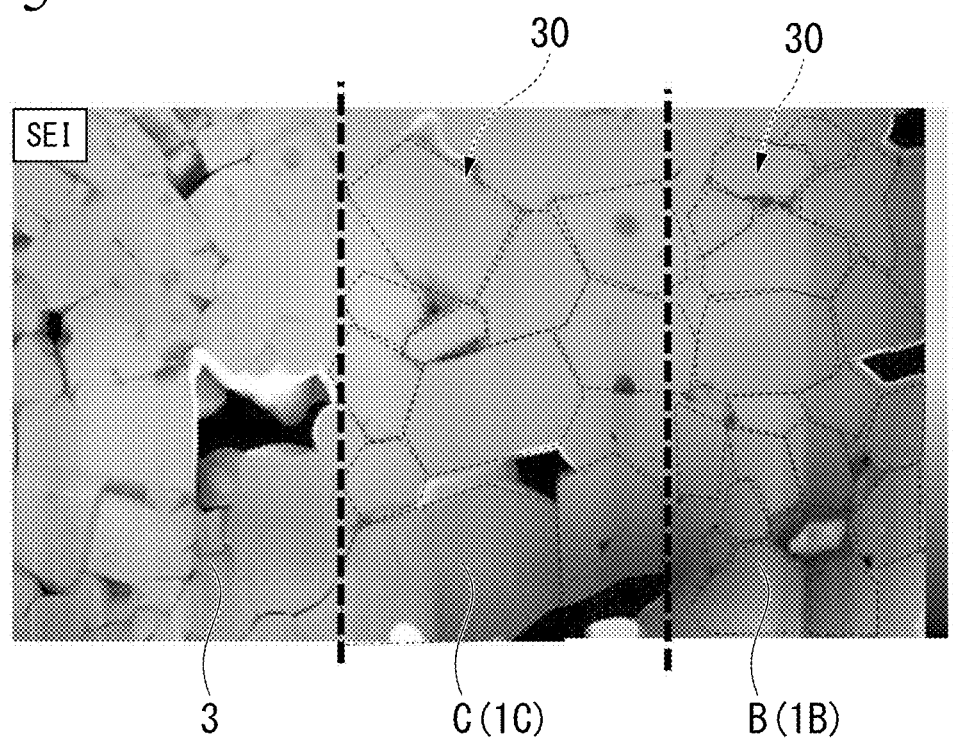
FIG. 5 is a cross-sectional view of a main part of a battery captured by a scanning type microscope.

FIG. 5 illustrates a secondary electron image (SEI) of a main part of the all-solid lithium ion secondary battery according to the embodiment. FIG. 5 illustrates a secondary electron image of the positive electrode active-material layer 1B and the positive electrode intermediate layer 1C. Both of the positive electrode intermediate layer 1C and the negative electrode intermediate layer 2C are layers configured to connect the active material and the solid electrolyte. Hereinafter, the positive electrode intermediate layer 1C and the negative electrode intermediate layer 2C are collectively referred to as an intermediate layer C. In FIG. 5, for the sake of facilitating the understanding of grain boundaries of particles constituting the active-material layer B and the intermediate layer C, the grain boundaries of the particles are partially illustrated using dotted lines.

Since the intermediate layer C connects the active material and the solid electrolyte, its composition is intermediate between the solid electrolyte 3 and the shell region 22A constituting the active material 20. Since the composition of the intermediate layer C is intermediate between the solid electrolyte 3 and the shell region 22A, a difference in composition between the solid electrolyte 3 and the shell region 22A is alleviated. For this reason, it is possible to enhance the adhesion between the solid electrolyte 3 and the active-material layer B and to reduce the internal resistance of the all-solid lithium ion secondary battery.

Here, the expression "a composition is intermediate" can be defined as follows. For example, a case in which the solid electrolyte 3 and the shell region 22A contain identical elements mean that a ratio of common elements is present between a ratio of common elements in the solid electrolyte and a ratio of common elements in the shell region 22A. On the other hand, a case in which the solid electrolyte 3 and the shell region 22A do not contain identical elements means that a ratio of common elements in the intermediate layer C and the solid electrolyte 3 is 0 or more and a ratio or less of the solid electrolyte 3 and a ratio of common elements in the intermediate layer C and the shell region 22A is 0 or more and ratio or less of the shell region 22A.

The intermediate layer C preferably contains the same element as the active-material layer B and the solid electrolyte 3. By including the same element, the joining at the interface between the active-material layer B and the solid electrolyte 3 is stronger.

For example, when the above-described general formula (1) is satisfied for the core region 21A and the shell region 22A in the active material 20, it is desirable that the composition expression represented by the general formula (1) be also satisfied for the intermediate layer C. Furthermore, in this case, 0.5≤a≤3.0, 1.0≤b≤1.2, 0.06≤c≤0.09, 0.6≤d≤1.4, 2.8≤e≤3.2, and 0≤x<12 are preferably satisfied for and 0.8≤a≤3.0, 1.0≤b≤1.2, 0.06≤c≤0.09, 0.6≤d≤1.4, 2.9≤e≤3.1, and 0≤x<12 are more preferably satisfied for the intermediate layer.

Also, a crystal structure of the intermediate layer C preferably has the identical crystal structure to the crystal structure of at least one of the solid electrolyte 3 and the active material 20. The identical crystal structure means having the same space group. When crystal structures are the same, distortion at the interface hardly occurs and the adhesion between the solid electrolyte 3 and the active-material layer B enhances.

When the intermediate layer C is viewed from a structural point of view, as illustrated in FIG. 5, the intermediate layer C has particles 30 larger than an average particle size of the active material 20 constituting the active-material layer B. Furthermore, an average particle size of the particles 30 constituting the intermediate layer C is preferably larger than an average particle size of the active material 20 constituting the active-material layer B.

The intermediate layer C is a layer configured to enhance the adhesion between the active-material layer B and the solid electrolyte 3. When the average particle size of the particles 30 constituting the intermediate layer C is larger than the average particle size of the active material 20, the adhesion between the active-material layer B and the solid electrolyte 3 enhances. The following reasons can be considered as the reasons for this.

The first reason is due to a structure. When there are few grain boundaries in the intermediate layer C, the interfaces at which the adhesion decreases are reduced. That is to say, when the average particle size of the particles 30 constituting the intermediate layer C is large, the particles 30 constituting the intermediate layer C serve as a strong bridge and thus the adhesion between the active-material layer B and the solid electrolyte 3 enhances.

The second reason is due to a manufacturing process. The laminate 4 is obtained by laminating sheets serving as the foundations of the solid electrolyte 3, the intermediate layer C, and the active-material layer B and heating and firing the sheets. During heating and firing, for example, particles in the sheets serving as the intermediate layer C are joined to neighboring particles while partially melting to form one large particle. A largely formed particle more easily melts than the active material constituting the active-material layer B. That is to say, it is also conceivable that particles in a sheet serving as the foundation of the intermediate layer C melt during a firing process to firmly connect the active-material layer B and the solid electrolyte 3 and the adhesion between the active-material layer B and the solid electrolyte 3 enhances.

A thickness of the intermediate layer C is preferably a thickness or more of the shell portion 22 including the shell region 22A. To be specific, the thickness of the intermediate layer C is preferably 0.5 μm or more and 5.0 μm or less.

In the active material 20, the shell portion 22 does not necessarily cover the core portion 21. For this reason, a part of the core portion 21 is exposed in some cases. The core portion 21 and the solid electrolyte 3 have different compositions, structures, shapes, and the like and have the adhesion being poorer than that of the shell portion 22. For this reason, even when a part of the active material 20 is exposed, since the intermediate layer C equals to or more of the thickness of the shell portion 22, it is possible to prevent the core portion 21 and the solid electrolyte 3 from being in direct contact with each other. On the other hand, when the intermediate layer C is too thick, a distance over which lithium ions move increases between layers of the laminate 4 and the charge/discharge efficiency of the all-solid lithium ion secondary battery 10 decreases.

"Solid Electrolyte"

The solid electrolyte 3 is preferably a phosphate-based solid electrolyte. Furthermore, as the solid electrolyte 3, it is desirable to use a material having a low electron conductivity and a high lithium ion conductivity.

For example, the solid electrolyte 3 is preferably made of at least one selected from the group consisting of a perovskite type compound such as $La_{0.5}Li_{0.5}TiO_3$, a silicon type compound such as $Li_{14}Zn(GeO_4)_4$, a garnet type compound such as $Li_7La_3Zr_2O_{12}$, a nasicon type compound such as a lithium titanium aluminum phosphate [$Li_fAl_gTi_hPiO_{12}$ (f, g, h, and i are numbers which satisfy $0.5 \leq f \leq 3.0$, $0.09 \leq g \leq 0.50$, $1.40 \leq h \leq 2.00$, and $2.80 \leq i \leq 3.20$)] and $Li_{1.5}Al_{0.5}Ge_{1.5}(PO_4)_3$, a thiolisicon type compound such as $Li_{3.25}Ge_{0.25}P_{0.75}S_4$ and $Li_3PS_4$, a glass compound such as $Li_2S-P_2S_5$ and $Li_2O-V_2O_5-SiO_2$, and a phosphoric acid compound such as $Li_3PO_4$, $Li_{3.5}Si_{0.5}P_{0.5}O_4$, and $Li_{2.9}PO_{3.3}N_{0.46}$.

Also, the solid electrolyte 3 is preferably selected in accordance with the active material 20 constituting the intermediate layer C and the active-material layer B. The solid electrolyte 3 more preferably contains the identical elements as the intermediate layer C, the core region 21A, and the shell region 22A and is more preferably represented by the same composition expression.

Since the solid electrolyte 3 contains the identical elements to the intermediate layer C, the core region 21A, and the shell region 22A, the joining at the interface between the active-material layer B and the solid electrolyte 3 is strong. Furthermore, it is possible to increase a contact area at the interface between the active-material layer B and the solid electrolyte 3.

For this reason, when the core region 21A and the shell region 22A are represented by a general formula (1), it is desirable that the solid electrolyte 3 also contains a compound represented by the general formula (1).

In the general formula (1), $0.5 \leq a \leq 3.0$, $0.01 \leq b < 1.00$, $0.09 < c \leq 0.30$, $1.4 < d \leq 2$, $2.8 \leq e \leq 3.2$, and $0 \leq x < 12$ are preferably satisfied and $0.8 \leq a \leq 3.0$, $0.01 \leq b < 1.0$, $0.09 < c \leq 0.3$, $1.4 < d \leq 2$, $2.9 \leq e \leq 3.1$, and $0 \leq x < 12$ are more preferably satisfied for the solid electrolyte 3.

(Terminal)

It is desirable to use a material having a high conductivity for a first internal terminal 5 and a second internal terminal 6 of the all-solid lithium ion secondary battery 10. For example, silver, gold, platinum, aluminum, copper, tin, nickel can be used. The same material can be used for the first external terminal and the second external terminal (not shown). Internal terminals (the first internal terminal 5 and the second internal terminal 6) and external terminals (the first external terminal and the second external terminal) may be made of the same material or may be made of different materials. The external terminal may be formed in a single layer or a plurality of layers.

(Protective Layer)

Also, the all-solid lithium ion secondary battery 10 may include a protective layer configured to electrically, physically, and chemically protect the laminate 4 and the terminal on an outer circumference of the laminate 4. As a material constituting the protective layer, it is desirable that the material have excellent insulating property, durability, and moisture resistance and be environmentally safe. For example, it is desirable to use glass, ceramics, a thermosetting resin, or a photocurable resin. A material of the protective layer may be only one type or a combination of a plurality of materials. Furthermore, although the protective layer may be formed in a single layer, it is desirable to include a plurality of layers. Among them, an organic/inorganic hybrid obtained by combining a thermosetting resin and ceramic powders is particularly desirable.

(Method for Manufacturing Active Material)

An example of a forming method for forming the active material 20 will be described. It should be noted that the active material 20 is not limited to the following forming method.

Methods for manufacturing the active material 20 differ between a case in which the core portion 21 and the shell portion 22 are made of different materials and a case in which the core portion 21 and the shell portion 22 are made of a material represented by the same composition expression.

When the core portion 21 and the shell portion 22 are made of different materials, first, materials used for the core portion 21 and the shell portion 22 are selected. At that time, substances are selected to satisfy the above-described relationship between the core region 21A and the shell region 22A.

Moreover, the core portion 21 is coated with the shell portion 22. As a coating method, a known method can be used. For example, a vapor phase method such as a CVD method and a laser ablation method, a liquid phase method such as a spray drying method and a hanging drop method, a solid phase method of performing mixing while applying shear stress, or the like can be used.

By firing the active material 20 coated with the shell portion 22 at 400° C. or higher, elements constituting the core portion 21 and the shell portion 22 diffuse to each other and are in a solid solution state. As a result, the active material 20 is obtained.

When the core portion 21 and the shell portion 22 are made of the same material, first, a substance serving as the foundation of the active material is wet-mixed. For example, in the case of preparing a substance of the general formula (1), $Li_2CO_3$, $Al_2O_3$, $V_2O_5$, $TiO_2$, and $NH_4H_2PO_4$ are wet-mixed using a ball mill or the like.

Water in the obtained powder is removed, the obtained powder is dried, and then the obtained powder is calcined in air. The calcined product is wet-pulverized using a ball mill and water in the calcined product is removed and the obtained powder is dried. Finally, by performing main firing in a reducing atmosphere, the active material 20 having the core region 21A and the shell region 22A is obtained.

(Method for Manufacturing all-Solid Lithium Ion Secondary Battery)

A simultaneous firing method or a sequential firing method may be used for a method for manufacturing the all-solid lithium ion secondary battery 10.

The simultaneous firing method is a method of laminating material for forming layers and preparing a laminate through batch firing. The sequential firing method is a method for sequentially preparing layers and a firing step is introduced every time each layer is prepared. Using the simultaneous firing method can reduce the number of working steps of the all-solid lithium ion secondary battery 10. Furthermore, when the simultaneous firing method is used, the dense laminate 4 is obtained. A case in which the simultaneous firing method is used will be described below as an example.

The simultaneous firing method includes a step of preparing pastes for materials constituting the laminate 4, a step of preparing a green sheet by coating the materials with the pastes and drying the pastes, and a step of laminating green sheets and simultaneously firing the prepared laminated sheet.

First, materials of a current collector layer A, the active-material layer B, the intermediate layer C, and the solid electrolyte 3 constituting the laminate 4 are made into pastes.

A method for performing converting into a paste is not particularly limited. For example, a paste is obtained by mixing a powder of each material with a vehicle. Here, a vehicle is a generic name of a medium in a liquid phase. The vehicle includes a solvent and a binder. By such a method, a paste for the current collector layer A, a paste for the active-material layer B, a paste for the intermediate layer C, and a paste for the solid electrolyte 3 are prepared.

Subsequently, the green sheet is prepared. The green sheet is obtained by coating a base material such as polyethylene terephthalate (PET) with the prepared pastes in a desired order, drying it if necessary, and then peeling the base material. A method of coating a base material with a paste is not particularly limited. For example, a known method such as screen printing, coating, transferring, and a doctor blade can be adopted.

The prepared green sheets are stacked in a desired order and the number of layers. A laminate is prepared by performing alignment, cutting, and the like in accordance with the necessity. When a parallel type or serial/parallel type battery is prepared, it is desirable to perform stacking by performing alignment so that an end surface of a positive electrode current collector layer and an end surface of a negative electrode current collector layer do not coincide with each other.

When a laminate is prepared, an active-material layer unit which will be described below may be prepared to prepare the laminate.

First, a solid electrolyte layer is formed by forming the paste for the solid electrolyte 3 on a PET film in the form of a sheet using a doctor blade method a drying the paste. The paste for the intermediate layer C is printed on the obtained solid electrolyte layer using screen printing and dried to form the intermediate layer C.

Subsequently, similarly, the paste for the active-material layer B and the paste for the current collector layer A are printed on the intermediate layer and dried. The active-material layer B and the current collector layer A are formed through drying. In addition, the paste for the active-material layer B and the paste for the intermediate layer C are printed thereto again using screen printing and dried. Moreover, by peeling the PET film, an active-material layer unit is obtained.

The obtained active-material layer unit is laminated. At that time, the current collector layer A, the active-material layer B, the intermediate layer C, the solid electrolyte layer, the intermediate layer C, the active-material layer B, and the current collector layer A are formed in this order. Units are deviated and stacked so that the current collector layer A of a first active-material layer unit extends only on one end surface and the current collector layer A of a second active-material layer unit extends only on the other end surface. A laminate is prepared by further stacking sheets for the solid electrolyte 3 with a predetermined thickness on both surfaces of the stacked units.

The prepared laminates are pressed in a lump. The pressing is performed while heating, but a heating temperature is, for example, 40 to 95° C.

A binder is removed by heating the pressed laminates, for example, at 500° C. to 750° C. under a nitrogen, hydrogen, and steam atmosphere. After that, a sintered body is obtained by performing heating at 600° C. to 1000° C. under a nitrogen, hydrogen, and steam atmosphere and firing. The firing time is, for example, 0.1 to 3 hours.

The sintered body may be put into a cylindrical container together with an abrasive such as alumina and subjected to barrel polishing. Thus, corners of the laminate can be chamfered. As another method, polishing may be performed through sandblasting. This method is desirable because this method can cut only a specific portion.

(Terminal Formation)

The first external terminal 5 and the second external terminal 6 are attached to the sintered laminate 4 (a sintered body). The first external terminal 5 and the second external terminal 6 are formed to come into electrical contact with the positive electrode current collector 1A and the negative electrode current collector 2A. For example, the first external terminal 5 and the second external terminal 6 can be formed on the positive electrode current collector 1A and the negative electrode current collector 2A exposed from a side surface of the sintered body through a known means such as a sputtering method, a dipping method, and a spraying coating method. When the first external terminal 5 and the second external terminal 6 are formed only in a predetermined portion, for example, the first external terminal 5 and the second external terminal 6 are formed after masking or the like is performed with a tape.

While the embodiments of the present invention have been described in detail above with reference to the drawings, the constitutions in the embodiments, a combination thereof, and the like are merely examples. In addition, additions, omissions, substitutions, and other modifications of the constitution are possible without departing from the gist of the present invention.

EXAMPLES

Example 1

An active material was prepared by a solid phase reaction method. First, as a substance serving as the foundation of the active material, $Li_2CO_3$, $Al_2O_3$, $V_2O_5$, $TiO_2$, and $NH_4H_2PO_4$ were prepared. These were wet-mixed in a ball mill for 16 hours. Water in a sample after the wet-mixing was removed, the sample was dried, and the sample was calcined at 800° C. for 2 hours in air. Moreover, the calcined product was subjected to milling using a ball mill for 16 hours, water in the calcined product was removed, and the calcined product was dried. The obtained powder was fired at 800° C. for 2 hours under a mixed gas atmosphere of nitrogen and 3% hydrogen to obtain an active material having a core region and a shell region.

The obtained active material was made into a paste to prepare a green sheet made of a negative electrode active material and a positive electrode active material. Furthermore, similarly, substances of the foundations of an intermediate layer, a current collector, and a solid electrolyte were prepared using the solid phase reaction method and green sheets were prepared. These prepared green sheets were laminated in a predetermined order, binders in the green sheets were removed at 650° C., and then the green sheets were fired at the same time. A simultaneous firing temperature was 800° C. and a firing time was 1 hour.

Figure 6A:
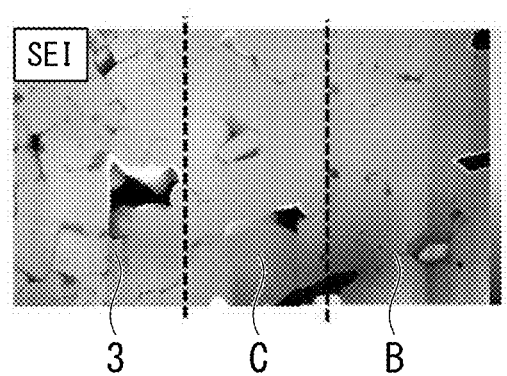
FIG. 6A is a composition analysis cross-sectional view (a secondary electron image (SEI)) of the main part of the battery.
Figure 6B:
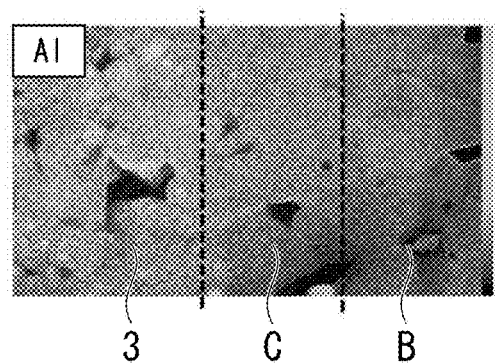
FIG. 6B is a composition analysis cross-sectional view (Al) of the main part of the battery.
Figure 6C:
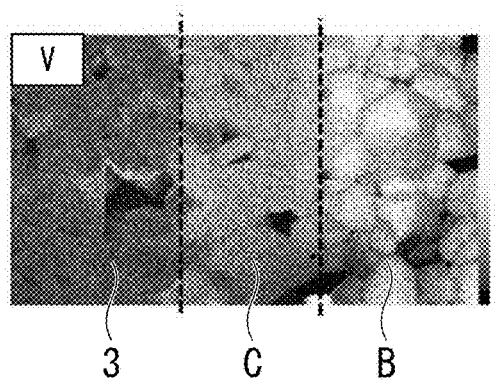
FIG. 6C is a composition analysis cross-sectional view (V) of the main part of the battery.
Figure 6D:
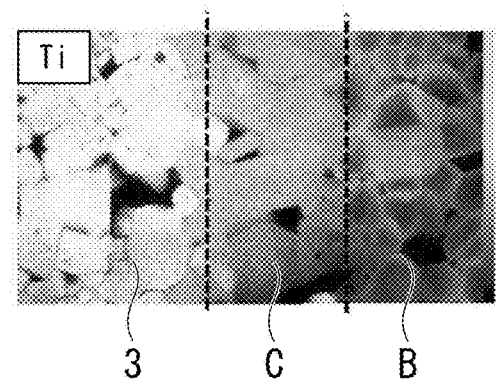
FIG. 6D is a composition analysis cross-sectional view (Ti) of the main part of the battery.

FIGS. 6A to 6D are composition analysis cross-sectional views of a main part of the obtained battery. FIG. 6A is a secondary electron image (SEI), FIG. 6B is a mapping image of an energy dispersive type X-ray analysis (EDX) of the element Al, FIG. 6C is a mapping image of the energy dispersive type X-ray analysis (EDX) of the element V, and FIG. 6D is a mapping image of the energy dispersive type X-ray analysis (EDX) of the element Ti. The compositions of the layers are as follows. In FIGS. 6A to 6D, reference symbol B indicates the active-material layer, reference symbol C indicates the intermediate layer, and reference numeral 3 indicates the solid electrolyte.

<Constitution of all-Solid Lithium Ion Secondary Battery in Example 1>

Positive electrode current collector and negative electrode current collector: mixture of Cu and the following active materials Positive electrode active-material layer and negative electrode active-material layer Core region: $Li_{2.9}V_{1.7}Al_{0.03}Ti_{0.40}P_{2.9}O_{12-x}$
Shell region: $Li_{2.4}V_{1.2}Al_{0.06}Ti_{0.90}P_{2.95}O_{12-x}$
Solid electrolyte: $Li_{1.0}V_{0.05}Al_{0.12}Ti_{1.70}P_{3.1}O_{12-x}$
Intermediate layer: $Li_{2.0}V_{1.0}Al_{0.07}Ti_{1.0}P_{3.0}O_{12-x}$ A ratio (Pc/(2Ps+Pc)) of an average particle size Pc of the core portion and a thickness Ps to the shell portion was 0.9. Furthermore, a thickness of the intermediate layer was 5 μm.

In addition, an average particle size of particles constituting the intermediate layer was 2 μm and a particle size of the active material was 1.5 μm. An average particle size of particles constituting the intermediate layer was larger than the particle size of the active material. All of the active material, the intermediate layer, and the solid electrolyte had a crystal structure of a nasicon structure.

Although an amount of oxygen is not specifically identified, heating is performed under a reducing gas atmosphere. Thus, an amount of oxygen deficiency of the shell region corresponding to an outer surface of a particle is conceivable to be larger than an amount of oxygen deficiency of the core region.

As illustrated in FIGS. 6A to 6D, the active-material layer B has a dense granular active material. As illustrated in FIG. 6B, the element Al is present uniformly in the active-material layer B. On the other hand, the element V and the element Ti are heterogeneously present. As illustrated in FIG. 6C, a large amount of element V is present near a central portion of each granular active material, and as illustrated in FIG. 6D, a large amount of element Ti is present near a surface of each granular active material. That is to say, the active material has a core-shell structure. It should be noted that, although both of the positive electrode active-material layer and the negative electrode active-material layer have the same constitution, only the layers on a positive electrode side are illustrated.

Moreover, an all-solid lithium secondary battery was prepared by applying an InGa electrode paste to an end surface of the obtained laminate immediately after firing and forming a terminal electrode. The all-solid lithium secondary battery was prepared by alternately laminating 26 positive electrode units and 25 negative electrode units.

A battery capacity of the all-solid lithium ion secondary battery in Example 1 was 113.3 μAh and an internal resistance thereof was 0.38 kΩ. The battery capacity was measured by performing charging and discharging at a constant current using a charge and discharge measuring machine. Here, a charge/discharge current was 30 μA and cutoff voltages during charging and discharging were 1.8 V and 0 V, respectively. Furthermore, a pause time after charging and after discharging were 1 minute. The internal resistance was obtained by dividing a difference (IR drop) between an open circuit voltage after charging pause (immediately before discharging starts) and a voltage after 1 second from a discharge start by a current value during discharging.

Comparative Example 1

Comparative example 1 and Example 1 differ in that an intermediate layer was not provided. Other conditions were the same as in Example 1.

A battery capacity of the all-solid lithium ion secondary battery in Comparative example 1 was 49.3 μAh and an internal resistance thereof was 9.4 kΩ. Since the all-solid lithium ion secondary battery in Comparative example 1 did not include an intermediate layer, the adhesion at a lamination interface was poor and the internal resistance thereof increased.

Comparative Example 2

Comparative example 2 and Example 1 differ in that, in an all-solid lithium ion secondary battery in Comparative example 2, a particle size of particles constituting an intermediate layer was changed. The particle size of the particles constituting the intermediate layer was controlled through a wet milling time using a pot mill different from that of Example 1.

An average particle size of the active material was 1.5 μm, the particle sizes of the particles constituting the intermediate layer was 1.0 μm, and the average particle size of the active material was larger than the particle size of the particles constituting the intermediate layer.

A battery capacity of the all-solid lithium ion secondary battery in Comparative example 2 was 62.1 μAh and an internal resistance thereof was 7.2 kΩ. It is conceivable that the reason why the internal resistance was increased as compared with Example 1 is because a particle size of particles constituting an intermediate layer was smaller than a particle size of particles constituting an active material and the sufficient adhesion could not be obtained.

Comparative Example 3

Comparative example 3 and Example 1 differ in that, in an all-solid lithium ion secondary battery in Comparative example 3, a composition of an intermediate layer was changed. That is to say, the composition of the intermediate layer was not between a positive electrode current collector, a negative electrode current collector, and a solid electrolyte.

<Constitution of all-Solid Lithium Ion Secondary Battery in Comparative Example 3>

Positive electrode current collector and negative electrode current collector: Mixture of Cu and the following active materials Positive electrode active-material layer and negative electrode active-material layer Core region: $Li_{2.9}V_{1.7}Al_{0.03}Ti_{0.40}P_{2.9}O_{12-x}$
Shell region: $Li_{2.0}V_{1.0}Al_{0.07}Ti_{0.9}P_{3.0}O_{12-x}$
Solid electrolyte: $Li_{1.0}V_{0.05}Al_{0.12}Ti_{1.7}P_{3.1}O_{12-x}$
Intermediate layer: $Li_{2.8}V_{1.4}Al_{0.04}Ti_{0.6}P_{3.0}O_{12-x}$ In Comparative example 3, the composition of the intermediate layer was not between the solid electrolyte and compositions of shell regions in the active materials. A battery capacity of the all-solid lithium ion secondary battery in Comparative example 3 was 45.3 μAh and an internal resistance thereof was 10.1 kΩ. It is conceivable that the reason why the internal resistance was increased as compared with Example 1 is because the intermediate layer did not function as a layer for alleviating a difference in composition and the sufficient adhesion could not be obtained.

Example 2

Example 2 and Example 1 differ in that, in an all-solid lithium ion secondary battery in Example 2, a composition of an intermediate layer was changed. The other points were the same as in Example 1.

As a result, a constitution of each layer of the all-solid lithium ion secondary battery in Example 2 was as follows.
<Constitution of all-Solid Lithium Ion Secondary Battery in Example 2>
Positive electrode current collector and negative electrode current collector: Mixture of Cu and the following active material
Positive electrode active-material layer and negative electrode active-material layer
  Core region: $Li_{0.5}V_{1.9}Al_{0.03}Ti_{0.55}P_{3.1}O_{12-x}$
  Shell region: $Li_{0.52}V_{1.2}Al_{0.06}Ti_{1.0}P_{3.12}O_{12-x}$
  Solid electrolyte: $Li_{0.6}V_{0.05}Al_{0.2}Ti_{1.75}P_{3.2}O_{12-x}$
  Intermediate layer: $Li_{0.55}V_{1.0}Al_{0.07}Ti_{1.15}P_{3.15}O_{12-x}$ A battery capacity of the all-solid lithium ion secondary battery in Example 2 was 108.6 μAh and an internal resistance thereof was 0.58 kΩ.

The above-described results are summarized in Table 1 below.

The measurement results of Examples 3 to 7 are summarized in Table 2 below.

TABLE 2

|  | Thickness of Intermediate layer (μm) | Battery capacity (μAh) | Internal resistance (kΩ) |
| --- | --- | --- | --- |
| Example 3 | 0.2 | 101.2 | 1.12 |
| Example 4 | 0.5 | 103.3 | 0.51 |
| Example 5 | 1 | 108.1 | 0.42 |
| Example 6 | 5 | 106.6 | 0.45 |
| Example 7 | 13 | 94.32 | 2.10 |

Since the thicknesses of the intermediate layers was not too thick when the thicknesses of the intermediate layers were in a range of 0.5 μm to 5 μm, a significant reduction in battery capacity was not observed. Furthermore, since the thicknesses of the intermediate layers are sufficient, the adhesion between the solid electrolyte and an active-material layer enhanced and the internal resistance thereof was sufficiently small.

INDUSTRIAL APPLICABILITY

By further reducing an internal resistance of an all-solid lithium ion battery, it is possible to further increase an output current of the all-solid lithium ion battery.

REFERENCE SIGNS LIST

1 Positive electrode layer
1A Positive electrode current collector

TABLE 1

|  |  | Li | V | Al | Ti | P | Pc/(2Ps + Pc) | Particle size of Intermediate layer (μm) | Particle size of Active layer (μm) | Internal resistance (kΩ) | Battery capacity (μAh) |
| --- | --- | --- | --- | --- | --- | --- | --- | --- | --- | --- | --- |
| Example 1 | Core region | 2.90 | 1.70 | 0.03 | 0.40 | 2.90 | 0.9 | 2 | 1.5 | 0.38 | 113.3 |
|  | Shell region | 2.40 | 1.20 | 0.06 | 0.90 | 2.95 |  |  |  |  |  |
|  | Intermediate layer | 2.00 | 1.00 | 0.07 | 1.00 | 3.00 |  |  |  |  |  |
|  | Solid electrolyte | 1.00 | 0.05 | 0.12 | 1.70 | 3.10 |  |  |  |  |  |
| Comparative example 1 | Core region | 2.90 | 1.70 | 0.03 | 0.40 | 2.90 | 0.9 | — | 1.5 | 9.4 | 49.3 |
|  | Shell region | 2.40 | 1.20 | 0.06 | 0.90 | 2.95 |  |  |  |  |  |
|  | Intermediate layer | — | — | — | — | — |  |  |  |  |  |
|  | Solid electrolyte | 1.00 | 0.05 | 0.12 | 1.70 | 3.10 |  |  |  |  |  |
| Comparative example 2 | Core region | 2.90 | 1.70 | 0.03 | 0.40 | 2.90 | 0.9 | 1 | 1.5 | 7.2 | 62.1 |
|  | Shell region | 2.40 | 1.20 | 0.06 | 0.90 | 2.95 |  |  |  |  |  |
|  | Intermediate layer | 2.00 | 1.00 | 0.07 | 1.00 | 3.00 |  |  |  |  |  |
|  | Solid electrolyte | 1.00 | 0.05 | 0.12 | 1.70 | 3.10 |  |  |  |  |  |
| Comparative example 3 | Core region | 2.90 | 1.70 | 0.03 | 0.40 | 2.90 | 0.9 | 2 | 1.5 | 10.1 | 45.3 |
|  | Shell region | 2.00 | 1.00 | 0.07 | 0.90 | 3.00 |  |  |  |  |  |
|  | Intermediate layer | 2.80 | 1.40 | 0.04 | 0.60 | 3.00 |  |  |  |  |  |
|  | Solid electrolyte | 1.00 | 0.05 | 0.12 | 1.70 | 3.10 |  |  |  |  |  |
| Example 2 | Core region | 0.50 | 1.90 | 0.03 | 0.55 | 3.10 | 0.9 | 2 | 1.5 | 0.58 | 108.6 |
|  | Shell region | 0.52 | 1.20 | 0.06 | 1.00 | 3.12 |  |  |  |  |  |
|  | Intermediate layer | 0.55 | 1.00 | 0.07 | 1.15 | 3.15 |  |  |  |  |  |
|  | Solid electrolyte | 0.60 | 0.05 | 0.12 | 1.75 | 3.20 |  |  |  |  |  |

Examples 3 to 7

Examples 3 to 7 and Example 1 differ in that, in Examples 3 to 7, thicknesses of green sheets for obtaining intermediate layers are increased and the thicknesses of the obtained intermediate layers are changed. Other conditions were the same as in Example 1.

1B Positive electrode active-material layer
1C Positive electrode intermediate layer
2 Negative electrode layer
2A Negative electrode current collector
2B Negative electrode active-material layer
2C Negative electrode intermediate layer
3 Solid electrolyte
4 Laminate 5 First internal terminal
6 Second internal terminal
20 Active material
21 Core portion
21A Core region
22 Shell portion
22A Shell region
30 Particle
A Current collector
B Active-material layer
C Intermediate layer

The invention claimed is:

1. An all-solid lithium ion secondary battery, comprising:
a pair of electrodes and a solid electrolyte provided between the pair of electrodes,
wherein at least one of the pair of electrodes includes an active-material layer and an intermediate layer disposed in a form of laminated sheets in this order on at least one side of the electrodes,
an active material constituting the active-material layer has a core-shell structure having a core region and a shell region,
a composition of the intermediate layer is intermediate between the solid electrolyte and the shell region, and
the core region of the active material, the shell region of the active material, the intermediate layer, and the solid electrolyte satisfy a general formula (1) below,

$Li_aV_bAl_cTi_dP_eO_{12-x}$ (1), $0.5 \leq a \leq 3.0$, $1.2 < b \leq 2.0$, $0.01 \leq c < 0.06$, $0.01 \leq d < 0.60$, $2.8 \leq e \leq 3.2$, and $0 \leq x < 12$ are satisfied in the core region,
$0.5 \leq a \leq 3.0$, $1.0 \leq b \leq 1.2$, $0.06 \leq c \leq 0.09$, $0.6 \leq d \leq 1.4$, $2.8 \leq e \leq 3.2$, and $0 \leq x < 12$ are satisfied in the shell region,
$0.5 \leq a \leq 3.0$, $1.0 \leq b \leq 1.2$, $0.06 \leq c \leq 0.09$, $0.6 \leq d \leq 1.4$, $2.8 \leq e \leq 3.2$, and $0 \leq x < 12$ are satisfied in the intermediate layer, and
$0.5 \leq a \leq 3.0$, $0.01 \leq b < 1.0$, $0.09 < c \leq 0.30$, $1.4 < d \leq 2.0$, $2.8 \leq e \leq 3.2$, and $0 \leq x < 12$ are satisfied in the solid electrolyte.

2. An all-solid lithium ion secondary battery, comprising:
a pair of electrodes and a solid electrolyte provided between the electrodes,
wherein at least one of the pair of electrodes includes an active-material layer and an intermediate layer disposed in a form of laminated sheets in this order on at least one side of the electrodes,
an active material constituting the active-material layer has a core-shell structure having a core region and a shell region,
the intermediate layer has a particle larger than an average particle size of the active material, and
the core region of the active material, the shell region of the active material, the intermediate layer, and the solid electrolyte satisfy a general formula (1) below,

$Li_aV_bAl_cTi_dP_eO_{12-x}$ (1), $0.5 \leq a \leq 3.0$, $1.2 < b \leq 2.0$, $0.01 \leq c < 0.06$, $0.01 \leq d < 0.60$, $2.8 \leq e \leq 3.2$, and $0 \leq x < 12$ are satisfied in the core region,
$0.5 \leq a \leq 3.0$, $1.0 \leq b \leq 1.2$, $0.06 \leq c \leq 0.09$, $0.6 \leq d \leq 1.4$, $2.8 \leq e \leq 3.2$, and $0 \leq x < 12$ are satisfied in the shell region,
$0.5 \leq a \leq 3.0$, $1.0 \leq b \leq 1.2$, $0.06 \leq c \leq 0.09$, $0.6 \leq d \leq 1.4$, $2.8 \leq e \leq 3.2$, and $0 \leq x < 12$ are satisfied in the intermediate layer, and
$0.5 \leq a \leq 3.0$, $0.01 \leq b < 1.0$, $0.09 < c \leq 0.30$, $1.4 < d \leq 2.0$, $2.8 \leq e \leq 3.2$, and $0 \leq x < 12$ are satisfied in the solid electrolyte.

3. The all-solid lithium ion secondary battery according to claim 1, wherein both of the pair of electrodes include the active-material layer and the intermediate layer.

4. The all-solid lithium ion secondary battery according to claim 1, wherein the intermediate layer has a crystal structure identical to at least a crystal structure of one of the solid electrolyte and the active material.

5. The all-solid lithium ion secondary battery according to claim 1, wherein a thickness of the intermediate layer is equal to or more than a thickness of the shell region.

6. The all-solid lithium ion secondary battery according to claim 1, wherein a thickness of the intermediate layer is 0.5 μm or more and 5.0 μm or less.

7. The all-solid lithium ion secondary battery according to claim 1, wherein
an amount of transition metals in the core region is more than an amount of transition metals in the shell region, and
an amount of oxygen deficiency in the shell region is more than an amount of oxygen deficiency in the core region.

8. The all-solid lithium ion secondary battery according to claim 1, wherein the core region contains 10 to 40 wt % of V and the shell region contains 0.1 to 15 wt % of Ti.

9. The all-solid lithium ion secondary battery according to claim 1, wherein an average particle size Pc of the core region and a thickness Ps of the shell region satisfy a relationship of $0.4 \leq Pc/(2Ps+Pc) \leq 0.98$.

10. The all-solid lithium ion secondary battery according to claim 1, wherein the active-material layer, the intermediate layer, and the solid electrolyte contain identical elements.

11. The all-solid lithium ion secondary battery according to claim 1, wherein
$0.8 \leq a \leq 3.0$, $1.2 < b \leq 2.0$, $0.01 \leq c < 0.06$, $0.01 \leq d < 0.60$, $2.9 \leq e \leq 3.1$, and $0 \leq x < 12$ are satisfied in the core region,
$0.8 \leq a \leq 3.0$, $1.0 \leq b \leq 1.2$, $0.06 \leq c \leq 0.09$, $0.6 \leq d \leq 1.4$, $2.9 \leq e \leq 3.1$, and $0 \leq x < 12$ are satisfied in the shell region,
$0.8 \leq a \leq 3.0$, $1.0 \leq b \leq 1.2$, $0.06 \leq c \leq 0.09$, $0.6 \leq d \leq 1.4$, $2.9 \leq e \leq 3.1$, and $0 \leq x < 12$ are satisfied in the intermediate layer, and
$0.8 \leq a \leq 3.0$, $0.01 \leq b < 1.0$, $0.09 < c \leq 0.3$, $1.4 < d \leq 2.0$, $2.9 \leq e \leq 3.1$, and $0 \leq x < 12$ are satisfied in the solid electrolyte.

12. The all-solid lithium ion secondary battery according to claim 1, wherein the pair of electrodes and the solid electrolyte provided between the pair of electrodes have a relative density of 80% or more.

13. The all-solid lithium ion secondary battery according to claim 2, wherein both of the pair of electrodes include the active-material layer and the intermediate layer.

14. The all-solid lithium ion secondary battery according to claim 2, wherein the intermediate layer has a crystal structure identical to at least a crystal structure of one of the solid electrolyte and the active material.

15. The all-solid lithium ion secondary battery according to claim 3, wherein the intermediate layer has a crystal structure identical to at least a crystal structure of one of the solid electrolyte and the active material.

16. The all-solid lithium ion secondary battery according to claim 13, wherein the intermediate layer has a crystal structure identical to at least a crystal structure of one of the solid electrolyte and the active material.

17. The all-solid lithium ion secondary battery according to claim 2, wherein a thickness of the intermediate layer is equal to or more than a thickness of the shell region.

18. The all-solid lithium ion secondary battery according to claim 3, wherein a thickness of the intermediate layer is equal to or more than a thickness of the shell region.

19. The all-solid lithium ion secondary battery according to claim 4, wherein a thickness of the intermediate layer is equal to or more than a thickness of the shell region.

20. The all-solid lithium ion secondary battery according to claim 2, wherein $0.8 \leq a \leq 3.0$, $1.2 < b \leq 2.0$, $0.01 \leq c < 0.06$, $0.01 \leq d < 0.60$, $2.9 \leq e \leq 3.1$, and $0 \leq x < 12$ are satisfied in the core region, $0.8 \leq a \leq 3.0$, $1.0 \leq b \leq 1.2$, $0.06 \leq c \leq 0.09$, $0.6 \leq d \leq 1.4$, $2.9 \leq e \leq 3.1$, and $0 \leq x < 12$ are satisfied in the shell region, $0.8 \leq a \leq 3.0$, $1.0 \leq b \leq 1.2$, $0.06 \leq c \leq 0.09$, $0.6 \leq d \leq 1.4$, $2.9 \leq e \leq 3.1$, and $0 \leq x < 12$ are satisfied in the intermediate layer, and $0.8 \leq a \leq 3.0$, $0.01 \leq b < 1.0$, $0.09 < c \leq 0.3$, $1.4 < d \leq 2.0$, $2.9 \leq e \leq 3.1$, and $0 \leq x < 12$ are satisfied in the solid electrolyte.

* * * * *